United States Patent
Nocker

[11] 4,124,776
[45] Nov. 7, 1978

[54] INFORMATION SYSTEM HAVING MULTIPLE ACCESS AND DECENTRALIZED EXCHANGE

[75] Inventor: Rudolf Nocker, Munich, Germany

[73] Assignee: Siemens Aktiengesellschaft, Berlin & Munich, Germany

[21] Appl. No.: 791,716

[22] Filed: Apr. 28, 1977

[30] Foreign Application Priority Data

Apr. 30, 1976 [DE] Fed. Rep. of Germany ....... 2619391

[51] Int. Cl.² ................................................ H04J 6/00
[52] U.S. Cl. ........................... 179/15 AL; 179/15 BA; 250/199
[58] Field of Search ........ 179/15 AL, 15 BD, 15 BA, 179/15 BY; 250/199

[56] References Cited

U.S. PATENT DOCUMENTS

| 3,846,587 | 11/1974 | Schenkel et al. | 179/15 BA |
| 3,859,465 | 1/1975 | Schenkel et al. | 179/15 AL |

Primary Examiner—Douglas W. Olms
Attorney, Agent, or Firm—Hill, Gross, Simpson, Van Santen, Steadman, Chiara & Simpson

[57] ABSTRACT

An information system has multiple access and decentralized exchange with a tree-type conductor network. The system comprises branches, branch points and stations, with each branch comprising two paths of mutually opposite transmission directions, all paths in the network having the same number of transmission channels. Each channel of a path is associated with a channel of the other path of the same branch, the two constituting a channel pair, and each channel pair of a branch is, oppositely, clearly associated with a channel pair of each adjacent branch in the network thus providing a channel-pair tree. Each station is connected to both paths of a branch and does not delete arriving signals, but reads such signals each station monitoring all channels upon both paths and a channel pair is considered to be busy when the occupation of at least one channel of the pair is detected. One channel pair tree is occupied for the transmission of signals between two stations.

24 Claims, 14 Drawing Figures

| $e_1$ | $e_2$ | $e_3$ | $a_{21}$ | $a_{31}$ | $a_{22}$ | $a_{32}$ | $a_{13}$ | $a_{23}$ |
|---|---|---|---|---|---|---|---|---|
| 0 | 0 | 0 | 1 | 0 | 1 | 0 | 1 | 0 |
| 0 | 0 | 1 | 0 | 1 | 0 | 1 | 1 | 0 |
| 0 | 1 | 0 | 1 | 0 | 1 | 0 | 0 | 1 |
| 0 | 1 | 1 | 1 | 0 | 0 | 1 | 0 | 1 |
| 1 | 0 | 0 | 1 | 0 | 1 | 0 | 1 | 0 |
| 1 | 0 | 1 | 0 | 1 | 1 | 0 | 1 | 0 |
| 1 | 1 | 0 | 1 | 0 | 1 | 0 | 1 | 0 |
| 1 | 1 | 1 | 1 | 0 | 1 | 0 | 1 | 0 |

INFORMATION SYSTEM HAVING MULTIPLE ACCESS AND DECENTRALIZED EXCHANGE

BACKGROUND OF THE INVENTION

1. Field of the Invention

The present invention relates to an information system having multiple access and a decentralized exchange, and more particularly to such a system having a tree-type conductor network comprising branches, branch points or nodes and stations, in which each branch consists of two paths of mutually opposite transmission directions, all paths in the network having the same number of transmission channels and each channel of a path being associated with a channel of the other path of the same branch to provide a channel pair, with each channel pair of a branch being oppositely and clearly associated with a channel pair of each adjacent branch in the network so that a channel pair tree is produced and each station is connected to both paths of a branch and does not delete arriving signals, but only reads such signals.

2. Description of the Prior Art

In an information network having decentralized exchange operation, a station can establish a connection with a desired other station entirely independently. For this purpose, the station must be independently able to receive messages from the information flow of a common transmission medium, or feed in, respectively. Each station must control all channels in the common transmission medium. Time multiplex technology is particularly suited for the realization of the above, since, in comparison with frequency multiplex technology, parallel control units can be omitted and essentially less band width is required, as compared with code multiplex technology.

Heretofore, loop conductor networks have primarily been discussed for such information networks operating on the decentralized principle. See, for example, the German published application No. 1,925,604. In a loop network, a single transmission direction is required and, for connection between two stations, only one transmission channel is necessary within the loop. Loop conductor networks, however, have the drawback that they can only be expanded with difficulty; furthermore, measures must be taken for preventing circulation of information blocks several times within the network which would cause blocking of the transmission path. This also renders the transmission from one loop to another more difficult.

In a tree-type conductor network, i.e. a conductor network which is designed without meshes, these drawbacks are avoided. However, each branch of such a network must consist of two paths having opposite transmission directions. A tree-type conductor network having time multiplex transmission technology has been described by Schenkel within the framework of the 1974 International Zurich Seminar on Digital Communication, wherein each double conductor of each network branch is subdivided into a transmitting line and a receiving line having opposite transmission directions, and each participant station is connected with the transmitting line and the receiving line of its network branch, whereby it transmits its information only upon the transmitting line and receives information directed thereto only on the receiving line. Received information is thereby not taken out of the flow of information, but is recognized when it passes the station. All receiving lines are connected with each other in each network node, and also all transmitting lines are similarly connected. At the end of only one branch, called network end A, the transmitting line is connected with the receiving line in order to supply the sum of all messages transmitted within the network to all participant stations, via the receiving lines. Therefore, all participant stations are also familiar with the occupation pattern of the time slots at the position of the greatest traffic flow. A timing generator at the end of another branch transmits synchronization blocks, periodically, upon the transmitting line of this branch. This synchronization information travels toward the network end A and, from there, to all participants via the receiving lines. Since each participant station must be synchronized with the time multiplex framework used for the information transmission, not only upon the receiving line but also upon the transmitting line, but the synchronization information is not present upon a number of transmitting lines, the synchronization information of the receiving line is received there at the end of the network branch, and it is delayed and fed to the transmission line. The delay in each of those network ends is selected in such a manner that the transit time from the network end via the point at which the receiving line and transmitting line are connected with one another, back to the same network end is supplemented to become an integer multiple of the duration of a time multiplex frame. Thereby, the entire network is in frame synchronism.

As compared with a loop conductor network, however, the messages transmitted by both participants must be transmitted upon each path, in the case of the tree-type conductor network. For this purpose, two channels are required for each connection upon both paths of each branch. In the case of an even arrangement of the stations upon a squared range, this will result in approximately four times the transmission expense, technically, in a case of an equal traffic load, as compared with loop conductor networks.

SUMMARY OF THE INVENTION

The object of the present invention, therefore, is to provide an information system having multiple access and decentralized exchange operation, which combines the flexible expansion advantages of a tree-type conductor network with small technical transmission expense.

In order to achieve this objective, in an information system of the type mentioned above, it is provided that each station monitors all channels upon both paths, and that a channel pair is considered to be busy when the occupation of at least one channel of this channel pair is detected and that only one channel pair tree is occupied for the transmission of signals between two stations.

The technical expense of transmission can be cut in half, as compared with the above-described prior system, for a system constructed in accordance with the principles of the present invention.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
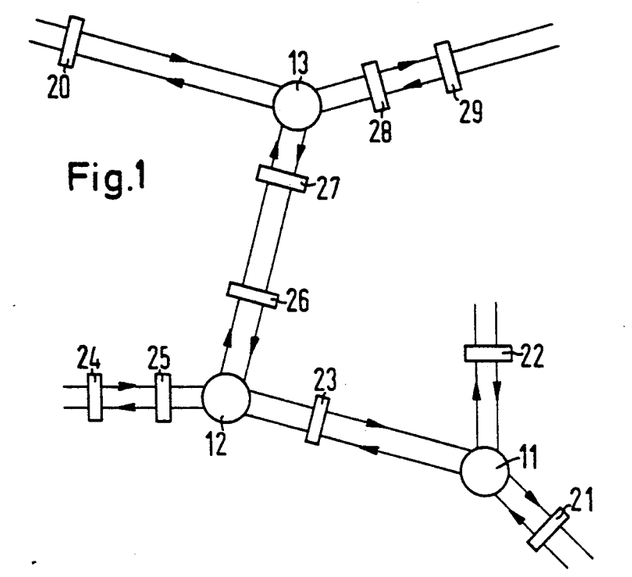
FIG. 1 is a schematic illustration of a tree-type conductor network utilizing decentralized exchange technology.

FIG. 1 illustrates the principle design of a tree-type conductor network, thus a network having decentralized exchange technology and designed without loops. The network comprises branches, each of which branches comprises two information paths having opposite transmission directions, as indicated by the arrows in FIG. 1.

In addition, a plurality of station 20–29 and branch points 11, 12 and 13 are provided in the network. The same number of transmission channels is, respectively, made available for the two paths of each branch. Each channel upon one of the paths is associated with a channel upon the opposite path.

The occupation status of each channel must be clearly recognizable, and it must also be possible to clearly differentiate useful information from calls and other signaling information. A channel is considered to be free when it and the associated channel upon the other path are free. If at least one of these two channels, which are respectively associated with one another, is busy upon the two paths, then the channel is considered to be occupied upon both paths.

Each station is connected to both paths and it monitors all channels upon both paths. Thereby, signals are never deleted by the stations, but are read by the stations.

Transmission may be effected in accordance with the following possibilities:
 (a) Each station transmits upon both paths leaving the station, upon the same channel pair;
 (b) Each station transmits only the call upon both outgoing paths, and thereafter only upon the path directed toward the called station;
 (A) Each station transmits in such a way that it replaces the signals received upon the corresponding channel by those signals which are to be transmitted; and
 (B) Each station transmits in such a way that it combines the signals received upon the corresponding channel with those to be transmitted (presuming that a corresponding coding provides that neither a call nor an unoccupied channel is simulated).

Therefore, the following combinations of possibilities result:

*aA, aB, bA, bB*

Figure 3:
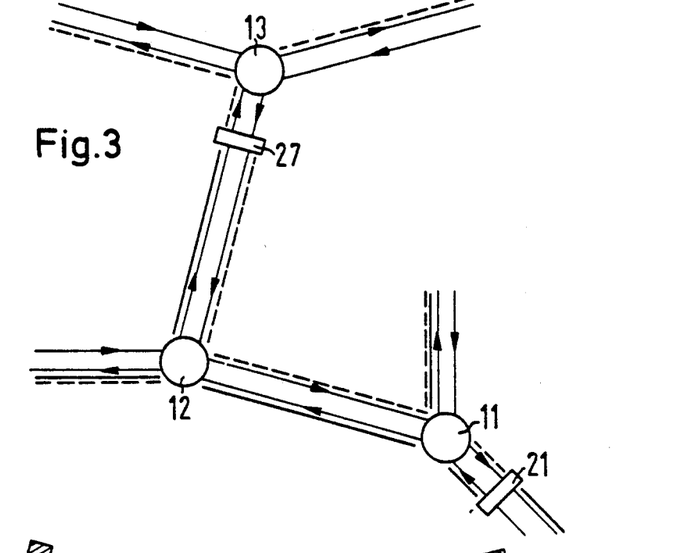
FIG. 3 is a schematic illustration of the information flow during dialogue between two stations within a tree-conductor network of the type illustrated in FIG. 1.
Figure 6:
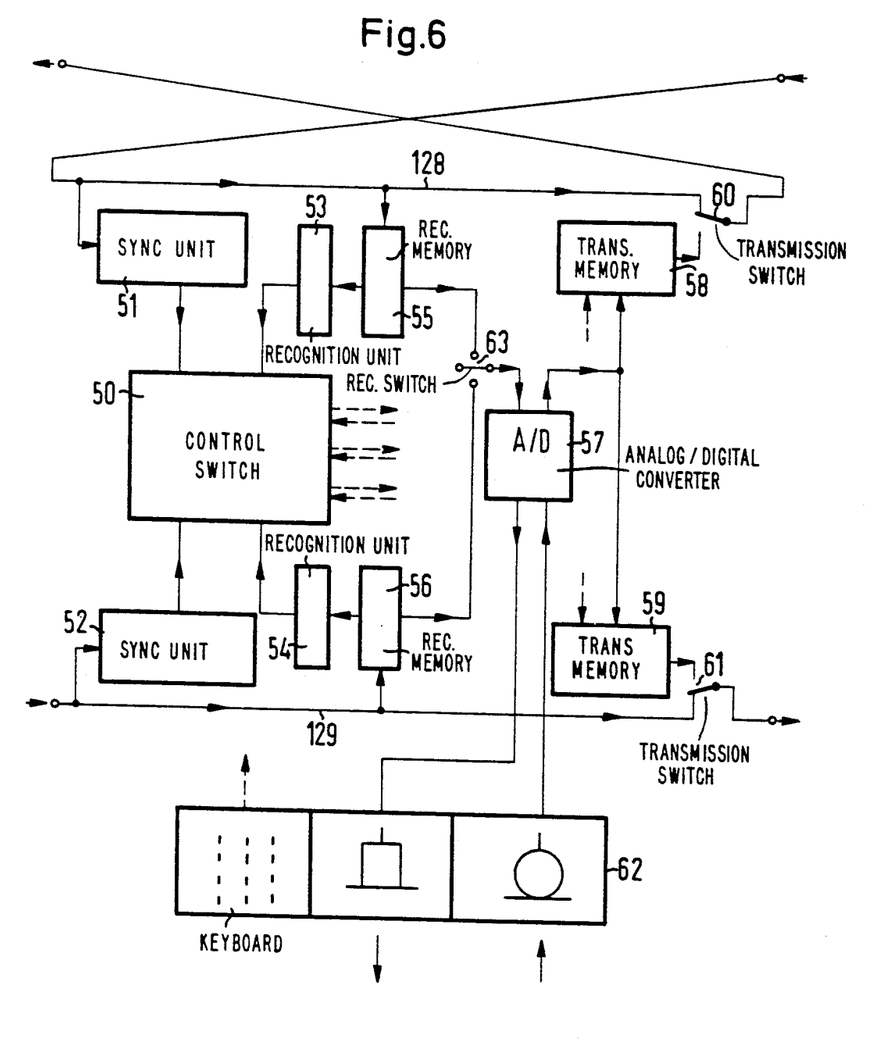
FIG. 6 is a schematic representation of a participant station.
Figure 14:
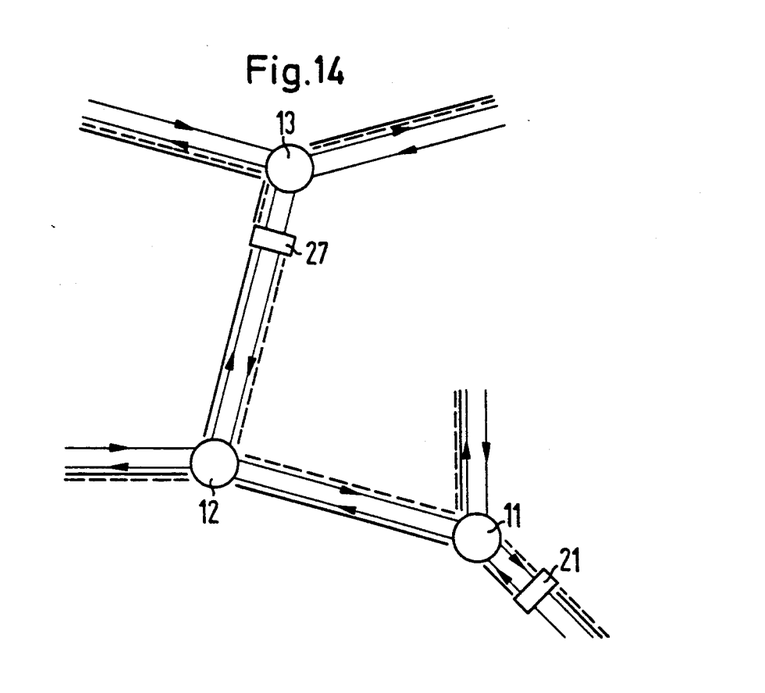
FIG. 14 illustrates the information flow which results during operation while using the branch system shown in FIG. 13.

The combination *a*A has been used in the exemplary embodiments of FIGS. 3 and 6. The combination *b*B is used in the exemplary embodiments of FIGS. 11 and 12. FIG. 14 illustrates operation in accordance with the combination *a*B. In the case of the combination *a*A and *b*A, the transmission switches are used for the connection of a participant station with the associated path, while OR gates are used for the combination *a*B and *b*B, and suitable coding methods are required for this purpose, as described below. In the case of the combination *b*A, the arriving signal can be replaced by a code signal in the direction which does not extend toward the other participating stations.

A simple branch system is present in each branch point which, in accordance with the given association of the channel pairs of adjacent branches, carries out switch-through, only in accordance with the presently existing busy state, namely in such a way that none is switched through upon an outgoing channel when the associated incoming channels of other branches are not busy, or that the outgoing channel is characterized as free and then, when only one of the associated incoming channels of all other branches is busy, this channel is switched through, and, when more than one of the associated incoming channels is busy, a desired one of these busy channels is switched through or the outgoing channel is characterized as busy.

It is stated that a free channel can be switched through even if no busy incoming channel must be switched through onto an outgoing channel. This must be provided if, for example, in the case of operation in accordance with time multiplex technology, synchronizing information, for example a timing bit, is contained in a free time channel, or if a distributed synchronization is used, respectively. Therefore, two cases are differentiated.

(a) If the considered outgoing channel extends in the direction of the sync generator, a free arriving channel of a desired other branch would be switched through; and
 (b) If the considered outgoing channel extends away from the sync generator, then that incoming channel which arrives from the direction of the sync generator will always be switched through.

This measure guarantees that synchronization is obtained when the network is switched on and is maintained, independelty of the occupation status. Building up of a circuit switched connection is effected in the following manner. After the calling party has gone off-hook, he is requested by his station to dial with the aid of dial tone. When the calling party has selected the complete call number of the called party, the calling station will search for a free channel. If a free channel is not present, the calling party will obtain a busy tone from the calling station. If, however, a free channel is found, it will be trial busied upon both paths. For this purpose, a busy characteristic signal, which is similar for all stations, will be transmitted. The transmission is thereby basically effected upon the same channel upon both paths.

In order to avoid that the same channel, which was previously free, is simultaneously trial busied by a more than one party, the calling station will monitor both paths, to see whether signals are received upon one of the two trial busy channels. If this is not the case for a certain minimum time, i.e. twice the maximum transit time of a message within the network plus the reaction time of a participant station, then it is guaranteed that the considered channels had not been busied simultaneously by another party. From this time forward, the busy state of the respective channels is known to each party station within the network. The channels under consideration are now considered to be finally occupied and busy.

If, however, information is received upon one of the two considered channels, during the trial occupation, they will be released immediately. The trial occupation is repeated at another channel, which is recognized to be free.

Figure 2:
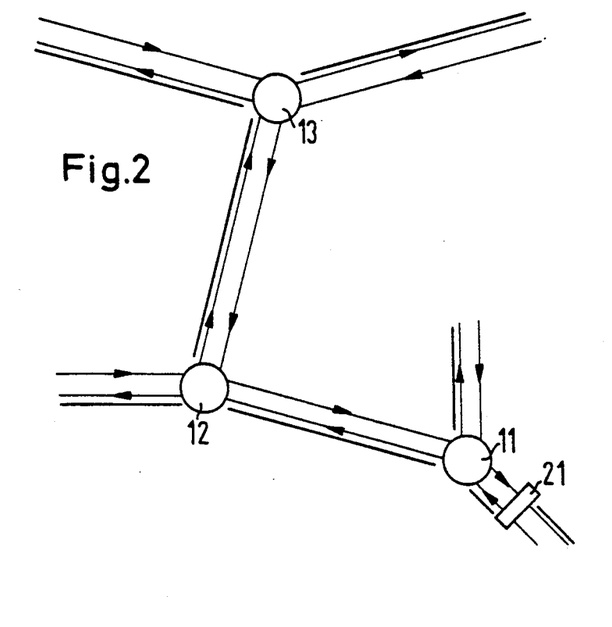
FIG. 2 schematically illustrates the extension of a call of a calling station within a tree-conductor network of the type illustrated in FIG. 1.

If two associated channels are finally busied, it will be possible, first of all, to transmit the identifying address for a possible fee computation in a central unit, and then the calling station will transmit the call. The propagation of the call within the network is illustrated in FIG. 2. The call contains the address of the called station. All stations continuously monitor both paths as to whether they are being called. If a station recognizes that it is being called, it will, from the time forward after such recognition receive upon this channel and upon the corresponding channel of the opposite path. During the transmission process, the information arriving in the used channel is basically replaced by the information to be transmitted. If the called party is free, the free message is transmitted and the call criteria (ringing identification) is switched on at the called party station. If the free message is received by the calling station, the free signal toward the calling party is switched on there.

If the called party goes off-hook, call criteria and the transmission of the free message are switched off by the called station. If the free message is no longer received in the calling station, this will cause the free sound and transmitting of the call to be switched off in the calling station. Simultaneously, the useful signal is from this time forward transmitted upon the busy channels upon both paths. In the same manner, the content of the busy channel of that path upon which the message has arrived is from now on switched through as a receiving signal toward the calling party by the calling station.

If the call no longer arrives in the called station, the content of the channel upon which the call has arrived will be switched through as a reception signal toward the called participant. From this time on, dialogue can occur between the two parties.

In a tree-type conductor network, only one path is provided between two stations. Upon this path, one of the two channels is used in the forward direction, and the associated channel upon the oppositely directioned path is used in the reverse direction, for the connection of the two stations. This results automatically by the described information guidance in the branch points. In FIG. 3, dialogue between the stations 21 and 27 has been shown. The messages of the station 27 are transmitted by the station 27 along the broken lines. The messages of the station 21 are transmitted by the station 21 along the unbroken lines.

In the branch points 11 and 12, which are located on the path between the two stations 21 and 27, information arrives upon the above-mentioned channel, on respectively two incoming paths, namely upon one path from one of the stations, for example from the station 21, and upon another path of the other station, for example the station 27. Due to the above-mentioned rule, a desired one of the two messages is switched onto the same channel of the outgoing path of those branches which do not belong to the path between the two considered stations 21 and 27, within this branch point, for example the branch points 11 and 12. This is illustrated in FIG. 3 in such a way that a continuous line and a broken line are illustrated in parallel.

In the reamining branch points, which are not on the way between the two stations, messages arrive only upon one incoming path, on the considered channel. These may be either messages of the calling station or of the called station. Since they are also transmitted upon all outgoing paths of all other branches, the busy state of all channels of all stations is known in the entire network.

If one of the two parties goes on hook, its station will transmit a termination signal and return to its rest state. In the opposite station, the receipt of the termination signal will cause the connection of the termination criterion, for example, the busy signal. Simultaneously, the two previously busied channels are released in such a manner that from now on nothing is transmitted. This station, however, announces the receipt of arriving calls by "called party occupied" until the party on this side also goes on hook.

In the case of the exemplary embodiment described here, the release of connection is thus effected by the party who hangs up first.

In order to compute the fee, a central unit may be provided at a desired position of the network. This is an advantage in the case of low network planes; in the case of execution of this principle with higher network planes, the counting within one station is more advantageous. The central fee computation unit requires for computing the fees, the knowledge of the address of the calling party, the address of the called party, the beginning time and the end time of the considered connection. All of these items of information which are required for computing the fee, are available at all points of the network.

The central unit therefore monitors all channels upon two paths. The address arriving first upon a previously free channel of one of the two paths is the address of the calling party, the call includes the call of the called party. The beginning time coincides with the first reception of useful information. The ending time is the release of the two associated busied channels.

Information systems having multiple access and decentralized exchange technology are particularly suited for construction in accordance with digital time multiplex technology. In the following discussion, the particularities resulted from the application of digital time multiplex technology in the case of an information system constructed in accordance with the invention will be considered.

Figure 4:
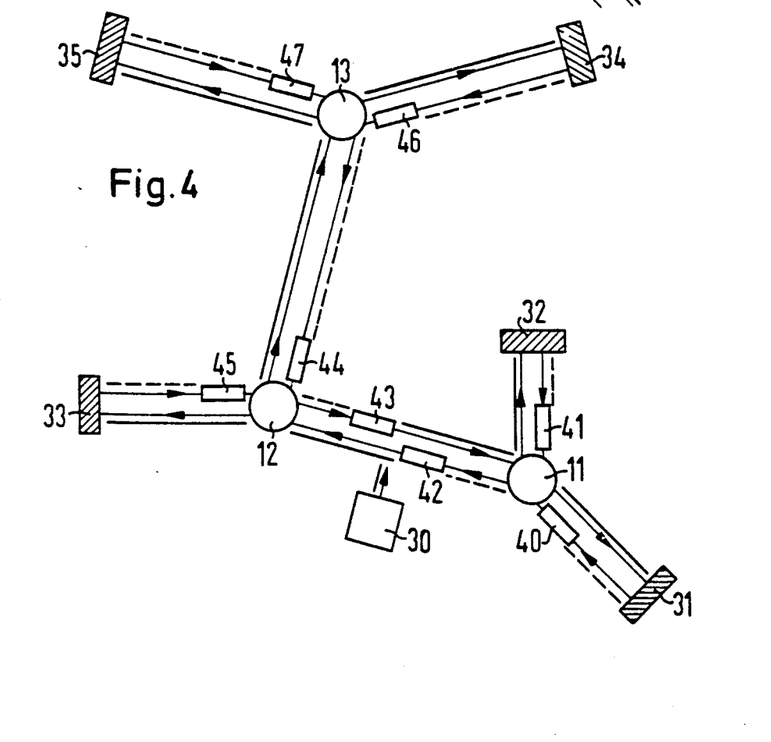
FIG. 4 schematically illustrates, in a system of the type illustrated in FIG. 1, synchronization during operation in accordance with time multiplex technology.

The required synchronization must be provided, in particular in the case of construction in accordance with digital time multiplex technology. As illustrated in FIG. 4, a branch is divided at a desired point of the network and a synchronization generator, hereinafter simply sync generator, 30 is connected to both paths. The sync generator 30 transmits the periodic synchronization signals and thereby determines the bit timing and the frame timing. The synchronization becomes particularly simple in the case of the application of a synchronization word within a specific synchronization channel.

In all branch points, the synchronization channel must be switched through in the same manner as a busy channel. In this manner, the synchronization information is distributed over the entire network. However, in this manner it is only respectively present upon one path of each branch. In order to transmit the synchronization information upon the other path, a reflex circuit 31, 32, 33, 34, 35 is provided at all network ends.

The synchronization information which is reflected at the network ends must, respectively, be delayed before the arrival in the next branch point, in such a way that it arrives simultaneously with the synchronization information arriving upon the other paths from the sync generator. For this purpose, delay systems 40, 41, 42, 43, 44, 45, 46 and 47 are provided in the respective branches between the reflex circuits 31–35 and the branch points 11, 12, 13. All bit flows arriving in a branch point are thus frame coincident.

The synchronization channel is switched through in all branch points, in the same manner as a busy information channel. If the sync generator is arranged at a desired network end, a reflex circuit and two delay systems can be saved. It is, of course, also possibel to shorten this branch in such a way that the end of the branch is positioned at the location of the branch point, and the sync generator can thus be arranged at the location of the associated branch system.

Figure 5:
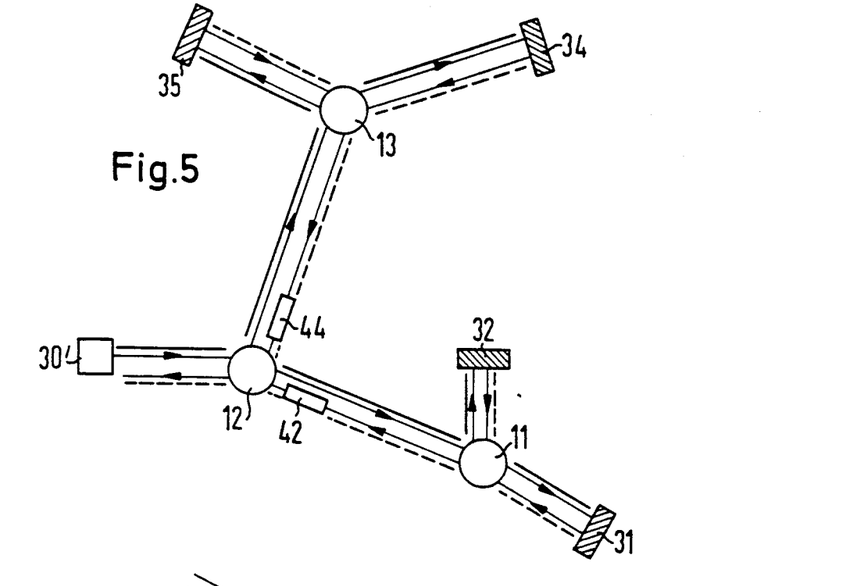
FIG. 5 is a schematic illustration of a variation of the synchronization illustrated in FIG. 4.

In accordance with another advantageous embodiment, as illustrated in FIG. 5, it is possible to effect the required delay of the synchronization information only in the reflex circuits 31, 32, 34, 35 in the case of the branches one side of which end is a network end. It is hereby advantageous if almost the entire delay is effected in the reflex circuit, while the remaining delay, together with the balance of transmit time fluctuations and jittering effects, occurs in a small, controllable intermediate memory, which is provided in each branch point 11, 12, 13 for each incoming path. It must also be possible to subsequently adjust the delay of the delay system in the reflex circuit, since the delay can change upon both paths, for example when additional stations are built in. This subsequent adjustment of the delay can be effected either manually or by way of a control signal which is transmitted toward the delay system.

In this manner, the possibly expensive delay system 40, 41, 43, 45, 46, 47 (FIG. 4) can be saved in the mentioned branches. Simultaneously, the advantage is obtained that, with the exception of the pure signal transit time upon the information conductors, the possible delay in the connected stations and the very small delay in the above-mentioned small intermediate memory, no further delay occurs for the signals which are to be transmitted as in the case of the passage of a delay system.

In the case of both branches, both ends of which are connected to a branch system, this solution is not possible. Here, the frame coincidence in the branch systems (branch points) can only be obtained by a controllable delay system.

In the case of the advantageous embodiment illustrated in FIG. 5, only two remaining controllable delay systems 42, 44 are present in the entire network, which is considered here, for obtaining the frame coincidence in the branch points, in the place of the eight delay systems 40–47 illustrated in FIG. 4. The number of the remaining delay systems corresponds to the number of paths which have both of their ends connected to a branch system. Only the above-mentioned small controllable intermediate memories are required for all remaining paths arriving in the branch points.

Advantageously, the frame design for telephone signals is, for an adaption to external PCM systems, selected in such a way that the number of the bits per time slot, which are applicable for the transmission of useful information, is selected as a $k$ multiple of eight bits ($k = 1, 2 \ldots$). The repetition frequency of the frame is then $8/k$ kHz, i.e. $k$ samples of each speech signal are comprised in a time slot.

In addition, at least one further bit per time slot is required. This bit will state whether useful information or signaling information is contained in the useful portion of the time slot. The signaling information is more clearly specified with a characterizing block within the time slot. The state "free" of a time slot is also signaling information and can be characterized in the stated manner. Advantageously, this will be characterized in such a way that the time slot contains only zeros.

In the case of a system constructed in accordance with the invention, switch-through of the time slots in the branch systems depends only on the previously described embodiment of the busied state of the time slot. If an extra bit is provided for the characterization of the busy state, then only the evaluation of this one bit is required in the branch system. This busy bit should have the state "busy" in the case of the synchronization time slot, since the synchronization time slot is to be switched through in the same manner as a busy time slot.

In order to guarantee perfect synchronization with acceptable expense, in the case of a desired occupation state and desired content of the time slots, it may be advantageous to provide a further bit per time slot as a timing bit. In this case, the possibility must be used in the branch systems that, if no busy incoming channel is to be switched through upon a channel of the outgoing path of a desired branch since the same channels of the arriving paths of the other branches are respectively free, one of the free channels is switched through.

Thus, at least one additional bit must be provided per time slot in addition to the useful bits. Advantageously, however, two to three additional bits will be used.

FIG. 6 illustrates, in a circuit block diagram form, a participant station. The receiving amplifiers required for receiving signals at each station are not illustrated, but are, of course, required. The station contains two synchronizing units 51, 52 for the bit synchronization and frame synchronization of the station, two receiving memories 55, 56, two recognition units 53, 54 for calls and signals, one receiving switch 63, two transmission memories 58, 59 with respective transmission switches 60, 61, an analog/digital converter 57, and a control unit 50.

All timing pulses required for the operation of the station in the two synchronizing units 50, 52, i.e. bit, time slot and frame pulses, are obtained from the bit flows of the two paths.

The bit flows along the two paths are written into the receiving memories 55, 56, whose capacity amounts to one time slot. A recognition circuit 53, 54 recognizes calls and signals and announces the same to the control unit 50. Only the content of the time channels, via which the station has built up a connection, is processed further toward the analog/digital converter 57. Therefore, as described, only one path is connected.

The messages and signal blocks which are to be transmitted are stored in the transmission memories 58 and 59. During the appropriate time slot, the respective transmission switch 60 or 61 is closed and the content of the transmission memory 58 or 59, respectively, is read out with the bit pulse.

The described processes are controlled by the control unit 50.

Figure 7:
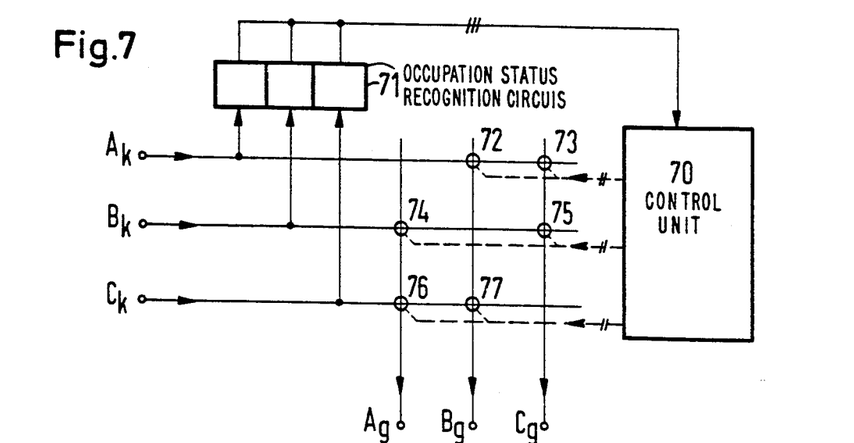
FIG. 7 is a schematic circuit diagram of a branch unit in a branch point, according to the present invention.

FIG. 7 illustrates a branching system which is suitable for application with digital time multiplex technology. As has already been described, each busy time slot arriving upon an incoming path must be switched through onto the outgoing path of all other branches, in the case of such a branch system. For the case in which more than one incoming time slot is to be switched to an outgoing path, a desired time slot will be selected and switched through. Thus, in the case of the presumed association of the channel pairs, whereby time channels of equal time positions are associated with one another in the time multiplex frame, a busy incoming time channel must never be switched through onto a time channel of another time position, within the branch system. The switch-through must only be effected onto time channels of an equal time position of the outgoing paths of other branches. This is possible with the aid of a very simple circuit. The schematic design of such a circuit for a branch point of the third degree has been illustrated in FIG. 7. The third degree means that the branch point is connected with three branches A, B, C. The incoming paths of the branches A, B and C are referenced by $A_k$, $B_k$ and $C_k$ and the outgoing paths are referenced $A_g$, $B_g$ and $C_g$.

The bit flows arriving upon the incoming paths $A_k$, $B_k$, $C_k$ are presumed to be frame coincident. An occupation state recognition circuit 71, which is driven into by the time slot pulse, determines the occupational status of the time slots. If a particular "occupied bit" is provided per time slot, only this bit must be evaluated for this purpose.

The busy state is stored in the occupation status recognition circuit 71, for the duration of a time slot, and is processed toward the control unit 70 as an input signal.

The control unit 70, on the basis of this occupation information, selects the coupling points which must be switched through for this time slot from the totality of the coupling points 72, 73, 74, 75, 76 and 77. In total, only six coupling points are required for a branch system of the third degree. If more than one coupling point per matrix column would have to be switched through in the matrix of the coupling points, a desired coupling point would be selected, for example always that one with the smallest line-number.

The control unit 70 comprises only a simple logic circuit with three inputs and six outputs and can also be realized with a few gates. The expense for the message guidance in the branch points is therefore extremely low.

Figure 8:
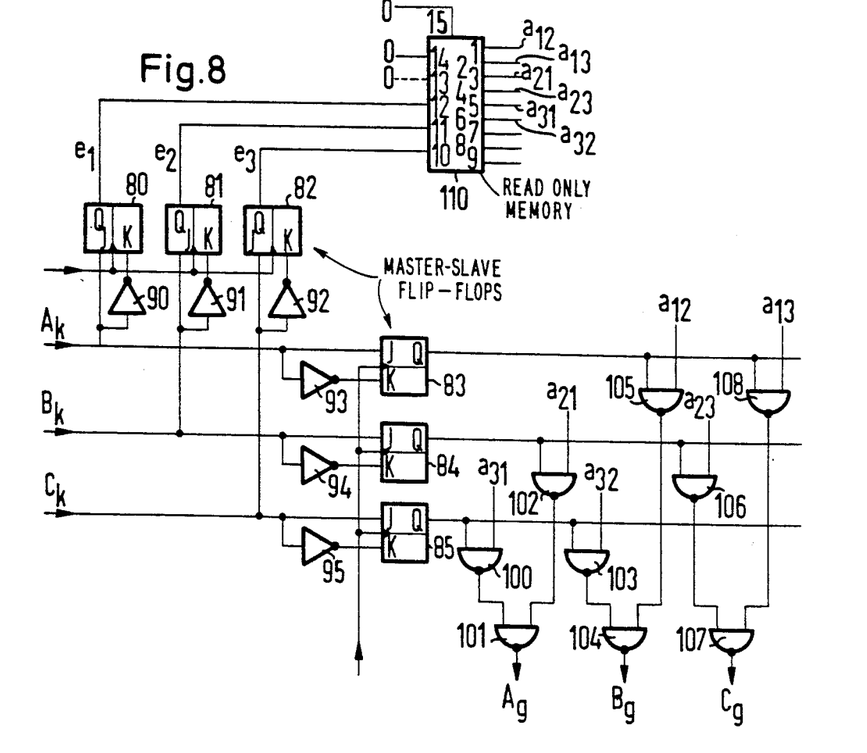
FIG. 8 is a detailed schematic logic diagram of a branch device in a branch point of a circuit in accordance with FIG. 7.
Figure 10:
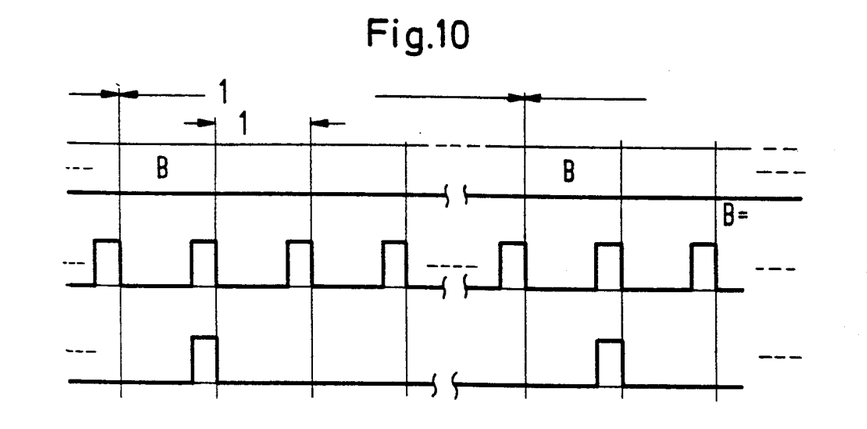
FIG. 10 is a signal chart representing the phase position of the timing pulses for a circuit constructed in accordance with FIG. 8.

FIG. 8 illustrates an exemplary embodiment of a branch system constructed in accordance with FIG. 7. In this example it has been assumed that a particular bit, the so-called busy bit, has been provided for the characterization of the busy state. Here, the first bit of the time slot has been selected for this purpose. In the case of a free time slot, this busy bit should have the value "0," otherwise the bit value is "1." For the operation of the circuit illustrated in FIG. 8, the bit pulse and the time slot pulse must be phased as illustrated in FIG. 10.

The exemplary circuit illustrated in FIG. 8 comprises six J-K master-slave flip-flops 80, 81, 82, 83, 84 and 85, for example of the type manufactured by Texas Instruments under the designation SN 7473, six inverters 90, 91, 92, 93, 94 and 95, for example of the type SN 7404, nine NAND gates 100, 101, 102, 103, 104, 105, 106, 107, and 108 each having two inputs, for example those identified as the Texas Instruments SN 7400, and a read only memory (ROM) 110 having a memory capacity of at least eight words of six bits each. For the read only memory, the Texas Instruments SN 7488 A is suggested as being suitable, this memory having a capacity of 32 words of eight bits each.

Figure 9:
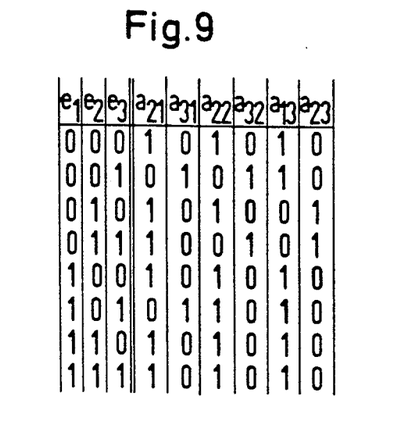
FIG. 9 is a table of binary values which apply to the circuit of FIG. 8.

The read only memory 110 supplies the control information $a_{12}, a_{13}, a_{21}, a_{23}, a_{31}, a_{32}$ for each value combination of the three input variables $e_1$, $e_2$ and $e_3$ for the triggering of the coupling points, and is to be programmed in accordance with the table of values illustrated in FIG. 9. It has been presumed when the table of values was obtained that the branch A arrives from the direction of the sync generator. For the case where more than one busy channel is to be switched through, or a desired free channel is to be switched through, the channel of the branch having the letter occurring earlier in the alphabet had, respectively, is selected.

The value of the first bit, that is of the busy bit, of each time slot is transferred into a flip-flop, together with the time slot pulse, and is stored in the flip-flop for the duration of a time slot. Since the output information of this flip-flop is available only from the end of a busy bit on, the input signals are delayed by one bit when they are supplied to the coupling fields. There, the switch-through of the signals onto the outgoing paths of the other branches occurs, in accordance with the control information $a_{12}, a_{13}, a_{21}, a_{23}, a_{31}$ and $a_{32}$.

In the case of the circuit in this illustration, the structure has been maintained as simple as possible since a read-only memory was used for the realization of the linkage $a_{ij} = f(e_1, e_2, e_3)$. It may, of course, also be replaced by a logical linkage circuit constructed of several NAND gates. In accordance with a further embodiment, the output signals may be transferred into three further flip-flops, at the outputs $A_g$, $B_g$, $C_g$, with timing pulses.

It can be guaranteed by way of safety bits, which are to be transmitted, for example, at the beginning of a frame, that the failure of the synchronization can be safety recognized. In such a case, suitable measures can be initiated.

Figure 11:
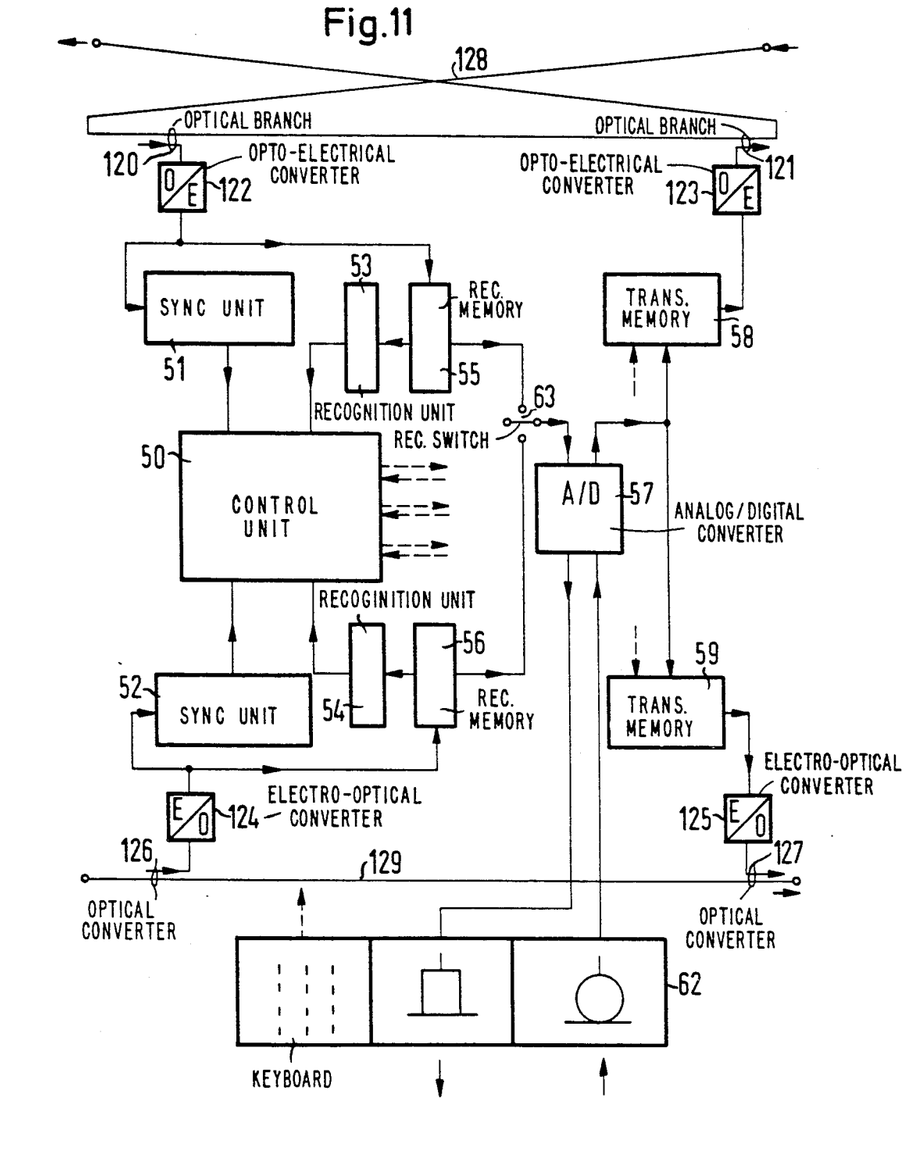
FIG. 11 is a schematic illustration of another embodiment of a participant station.

FIG. 11 illustrates a variation of a participant station which is particularly suited for information transmission by way of light wave conductors. As far as corresponding reference characters have been used, the design of this participant station coincides with that of the participant station illustrated in FIG. 6. The branching and feeding-in of information from the light conductors is, however, effected by way of optical component elements. Therefore, the number of opto-electrical and electro-optical converters, connected in series with the transmission path, can be decreased and the reliability of the information system can be improved. In the case illustrated in FIG. 11, the branching is effected by way of the optical branch systems 120 and 126 which couple out a minor portion of the light signals fed into the light conductors 128 and 129 and guides such signals onto the opto-electrical converters 122 and 123, respectively. The electrical signal produced at the output of the opto-electrical converters 122, 123 is then supplied to the synchronization units 51 or 52, respectively, and the receiving memories 55 or 56, respectively, in an analogous manner to that discussed above in connection with FIG. 6.

The transmission in the exemplary embodiment of FIG. 11 is carried out differently from that illustrated in FIG. 6. In order to be able to eliminate the transmission switches provided in FIG. 6, the function of the participant station, shown in FIG. 11, is somewhat changed, as compared with that described in connection with FIG. 6. It is true that each station is connected to both paths and controls all channels on both paths, also in the case of the participant station of FIG. 11. Here, the messages are never deleted, but only read out. However, the transmission is effected differently. The transmission of a call by a calling station is first of all effected upon both paths of the same channel. The calling station transmits upon the same channel, but only upon one path upon which the call has not arrived. After reception of a free message from the called station, a calling station will only transmit on that one path upon which the free message has not arrived.

In the case of this function of the stations, a message arriving at a station must never be replaced by another message. Due to this, the two transmission memories 58, 59 in each station can, respectively, be replaced by an OR gate having two inputs, in the case of the electrical transmission technique involved. One input of the OR gate is connected with the transmission memory, while the other input is connected with the path. The output of the OR gate is connected with the path which extends away from the transmission switch.

In the case of the optical transmission technique, the OR linkage can be effected in the manner illustrated in FIG. 11, by way of the optical couplers 121 and 127, respectively. The summation effected within this optical coupler, in connection with a subsequent threshold value decision which is always first effected during the reception of digital signals, results in an OR linkage. Then, two optical branches 120, 126 and two optical couplers 121, 127 are therefore required for the connections of a station to the two light wave conductors 128, 129. A light signal supplied by the electro-optical converters 124, 125 is at least partially superposed by the light signals fed in on the light wave conductors by optical couplers. If the optical components 120, 121, 126, 127 are inserted into the transmission path of the light conductors 128, 129, to begin with, then a station can be connected into an operating information network without interruption. The same holds true for the removal of the station, if these optical components can remain in the transmission path.

Figure 12:
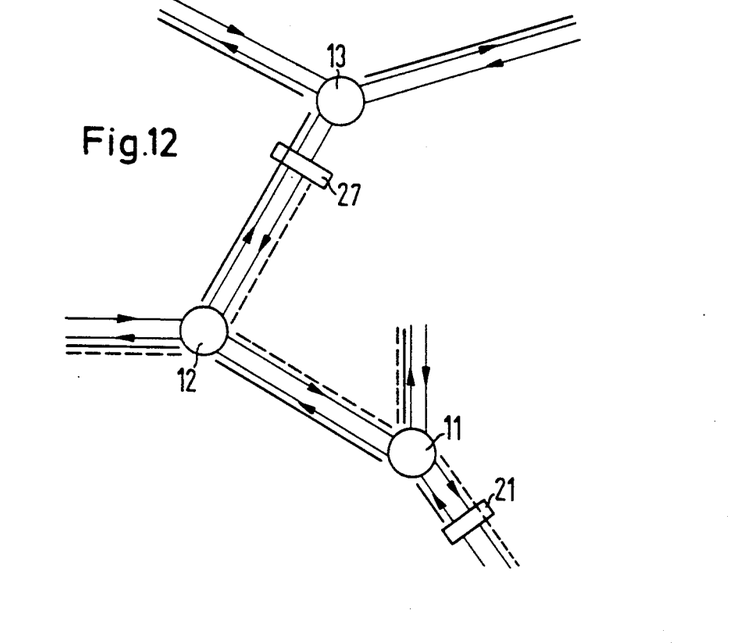
FIG. 12 is a schematic representation of a conductor network, illustrating the information flow for the circuit constructed in accordance with FIG. 11 is used as a participant station.

FIG. 12 illustrates the information flow during dialogue between two stations which transmit only a call upon both paths, but, as described, transmit only in the direction of the other participant during the dialogue. The reference characters and the type of the the representation of the information corresponds to that illustrated in FIG. 3.

When a connection is built up, certain differences result due to the different function of the participant station, as compared with the apparatus illustrated in FIG. 6. While the search for a free channel and its trial occupation, as it has been described in connection with FIG. 4, will still be effected, the transmission of a call after a final occupation of two associated channels is, at first, effected upon both paths. The call contains the address of the called station. All stations continuously monitor both paths as to whether they are being called. If a station recognizes that it is being called upon one of the two paths, it will, from that time, transmit a free message or a busy message upon the same channel. The called station basically only transmits upon this path, thus basically only in the direction in which the calling station is positioned.

If the called participant is free, the free message is transmitted, and the call criterion, i.e. the ringing signal, is switched on at the station of the called participant. If the free message is received by the calling station, then the free signal will be switched toward the calling party. The transmission is entirely stoped immediately upon the path upon which the free message arrives. From now on, the transmission in the calling station is only effected upon the path where the free message has not arrived, thus only in the direction of the called station. At first, the call continues to be transmitted upon this path.

Since the incoming free message or busy message, respectively, of the called party is, for a short time, superposed with the call, which has not yet been interrupted upon this path by the calling station (whereby this happens in the calling station) it must be guaranteed that no new call or a free channel is simulated by the OR linkage of these two signals, by way of a suitable coding of the call signal, on the one hand, and on the other hand, by the free message or busy message signal.

If the called party goes off-hook, then the call criterion and transmission of the free message are switched off by the called station. From now on, the useful signal is transmitted on the path, where previously the free message had been sent.

If the free message no more arrives in the calling station, this will cause the free signal to be switched off as well as the transmission of the call. Instead, the useful signal is transmitted from now on. In the same manner, the content of the busy channel of that path where the free message has arrived is from now on switched through to the calling party, as a receiving signal.

If the call no more arrives in the called station, the content of that channel upon which the call arrived will be switched through as a reception signal towards the called party. Dialogue can then occur between the two call participants. In the following discussion, a further variation of the system of the present invention will be described, which permits further circuit simplications, in particular in the case of an embodiment constructed in accordance with binary time multiplex technology.

The function of the stations is here again defined in such a manner that each station is connected to both paths, and monitors all channels upon both paths. Received messages are never deleted by a station, but only read by a station. The transmission is effected in accordance with a first alternative, upon both paths upon the same channel. Thereby, however, the "sum" of the message arriving upon the observed channel and the message which is to be transmitted is always transmitted upon each path. In accordance with a second alternative, the transmission can be effected as described in connection with FIG. 11, in such a manner that the call is only transmitted upon both paths, but is then only transmitted upon that one path which extends toward the other station, both from the calling station and from the called station. Both alternatives are applicable in connection with the measures described below.

In accordance with the stated function of the station, the transmission switches 60 and 61 in FIG. 6 are replaced by an inclusive OR gate, for this variation. The described type of operation presumes that calls and non-calls are characterized in such a manner that an additional call to one of the connected stations never occurs due to the linkage of the OR gates, and a busy channel also does not erroneously appear to be free.

The subsequently stated coding, in additon to the useful bits, which is applicable for the transmission of useful information requires only an additional bit, and thus results in a minimum bitflow increase.

Furthermore, useful information is simulated in the case of this coding, due to the combination of two messages only when at least one useful information was participating during the formation of the combination. This property is important when the free computation is to be effected by a central system at a desired position in the network. It is guaranteed in such a manner that a faulty fee computation cannot occur if a time condition in the central system is considered.

In the case of a free time slot, all bits of the time slots are to have the value "0." Thus, in the case of the bit-by-bit OR linkage of a busy time slot and a free time slot, the content of the busy time slot results in, as required.

The additional bit will state whether a busy time slot contains signaling information or other information.

If the time slot is busy and contains signaling information, the additional bit should be "0." Then a call will be represented by "1 0," and another signaling information by "0 1" upon two agreed bit positions within the useful bit group. In the following text, the values of these bit positions are stated in the manner: (additional bit, specification bit 1, specification bit 2).

If the time slot is busy and contains useful information, other than signaling information, the additional bit will have the value "1."

In the case of the described information system, a combination of two calls can never occur, since a call is transmitted by the calling station only upon one channel pair which is considered to be finally occupied.

When the called station replies, however, a combination of the messages from the calling and called stations may occur in paths or parts of paths which do not belong to the path between these two stations, as seen in FIG. 14. There, the combination of a call may occur with another signaling signal or also with other useful information, for a short time. When additional performance features are provided, a combination of different signaling signals may also occur, depending on the connection process.

In the case of the OR linkage of a call, with another signaling signal, the results (011) will result from (010) and (001). Since it is true that the additional bit here has the value "0," but the remaining bits are not all "0," the time slot is considered to be occupied and the content thereof is indicated as signaling information. Since, however, both specification bits have the value "1," it can be recognized immediately that a combination result is given.

In the case of the OR linkage of two other signaling signals, again (001) is produced from (001) and (001). Therefore, a false other signaling signal is generally produced.

If at least one useful information (other information bit) participates in the OR linkage, the value "1" will always result for the additional bit, and thus, false useful information is generally simulated.

Due to the above-stated possibility for the characterization of calls, other signaling signals and items of useful information, it is therefore avoided that a call or a free channel is simulated upon the paths or portions of paths which do not belong to the way between the two stations, due to the combination. Furthermore a useful item of information is only simulated that at least one useful item of information participated during the formation of a combination. Since this can only be the case after the called party has gone off hook, faulty fee computation is safely avoided if a time condition in the central unit for fee computation is considered.

The stated possibility for the characterization of calls, other signaling signs and items of useful information, is only one of many possibilities. In order to avoid the simulation of calls due to transmission faults, securing of these bits used for the differentiation of the different items of information is useful. In the most simple case, this can occur, for example, in such a manner that individual ones of these bits, or all relevant bits within the time slot, are provided twice.

If, for example, two bits are provided in addition to the useful bits, then the calls, the other signaling signals and the useful items of information can be characterized in such a manner, similarly as described above that each combination of two different types of information can be clearly recognized.

There also exists the possibility that the calling station and the called station code the transmitted items of information differently. Then, in the case of a corresponding coding, combinations of messages of a similar type can be rendered recognizable.

If the transmission of calls is effected upon special call channel pairs, then the simulation of calls in the useful channel pairs must not be considered. There, only a simulation of free channels and a simulation of useful information before the transmission of useful information by one of the two parties must be avoided.

Figure 13:
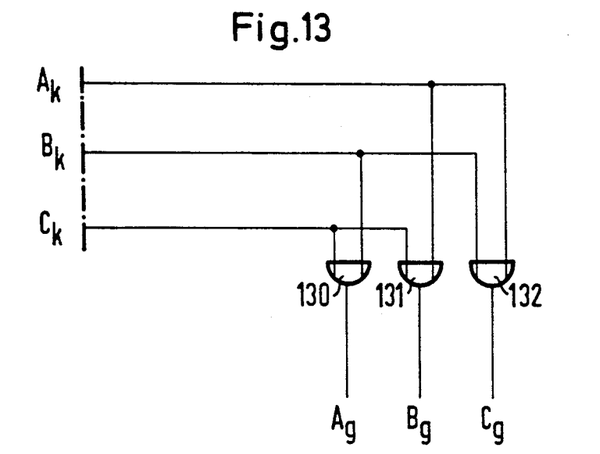
FIG. 13 is a schematic diagram of a variation of the branch system.

The stated coding, in particular, permits a particularly simple design of the branch systems. Such a branch system is illustrated in FIG. 13. Instead of controlled coupling points, as in FIGS. 7 and 8, simple uncontrolled, inclusive OR gates 130, 131 and 132 can be utilized. A branch system of the third degree, as has been illustrated herein, then only comprises three OR gates having two inputs each. This branch system always switches through the OR linkage of the messages upon each channel of each outgoing path, which messages arrive upon the same channels of the incoming paths of all other branches.

If the realization is effected as illustrated in FIG. 11, by way of the optical message transmission and feeding in the transmission signals via optical components, simple optical couplers 121, 127 can be applied in the stations.

The OR linkages in the branch systems can also be realized by optical components, as will be readily apparent to those versed in this art.

In another operation, as described in connection with FIG. 13, the occupation, the transmission of a call, the dialogue between parties, and the releasing of the connection, are effected in a similar manner as described before. If required, a free channel pair is first trial busied; for this purpose, an occupation characterization (busy signal) is transmitted upon both paths.

If more than one station trial busy a previously free channel, by way of transmitting the similar busy signal, and OR linkage or busy signals can occur in the branch points, which again will cause a busy signal. If information is received upon one of the two paths during the trial busy of a considered channel, the channel is immediately released again. It is therefore guaranteed that two associated channels can only be occupied by one individual station.

If the fee computation is effected in a central device, then the associated address is transmitted upon the finally occupied channels. Since this occurs after the final occupation of the channels, but before the transmission of the call and thus before the transmission of the called station, this address can never be falsified by way of "sum formation" and can thus be read without error at the central device for fee computation, this device is positioned at a desired position in the network.

The calling station then transmits its call; the message flow resulting therefrom corresponds to that illustrated in FIG. 2.

The further connection construction is effected as described above. The information flow during dialogue between two parties is illustrated in FIG. 14.

As can be seen, an OR linkage results only in those paths or parts of paths which are not positioned upon the way between the two stations, respectively, during the dialogue of the two stations. However, this is not disturbing since only the busy state of this channel must be communicated in these paths or parts of paths, respectively. Due to the stated characterization of calls and non-calls, it is avoided that due to the OR-linkage a call or a free channel are simulated in any phase of the dialogue of the two stations, thus during the connection, message exchange and release.

The releasing of the connection is effected in the manner described hereinabove.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In an information system of the type having multiple access and which operates with decentralized exchange switching in a tree-type conductor network, and which comprises branches, branch points and stations, each station having a unique address which is included in a call signal to that station, each branch including two paths of mutually opposite transmission directions and all paths of the network having the same number of transmission channels, each channel of a path being associated with a channel of the other path to form a channel pair, and each channel pair of a branch being clearly and oppositely associated with a channel pair of each adjacent branch in the network to form a channel pair tree, and in which each station is connected to both paths of a branch to receive calls, busy signals, free signals, other signaling signals and useful signals, the improvement comprising:
  monitoring means in each of the stations for monitoring all channels upon both paths,
  detecting means for detecting busy signals on the channels and indicating that a channel pair is busy in response to detection of a busy signal on either channel of the channel pair, and
  means for providing that only one channel pair tree is busy for the transmission of signals between two stations.

2. The improved system of claim 1, comprising:
frequency multiplex means for providing the channels on a frequency multiplex basis.

3. The improved system of claim 1, comprising:
frame and time slot generating means for providing the channels on a time multiplex basis.

4. The improved system of claim 1, wherein:
specific channel pairs are used to carry only call signals.

5. The improved system of claim 1, wherein:
the same channel pair is used to carry all signals between two stations.

6. The improved system of claim 1, wherein:
each of said stations comprises means for transmitting on both of said channels of a channel pair.

7. The improved system of claim 1, wherein:
each of said stations comprises means for transmitting call signals in both directions on the associated channels and means for transmitting all other signals on only the channel of the pair which extends toward the other station involved in the call.

8. The improved system of claim 7, wherein:
each of said stations comprises means for receiving signals and replacing the received signals with other signals on the corresponding channel.

9. The improved system of claim 7, wherein:
each of said stations comprises means for combining a received signal with another signal as a coding to prevent inadvertent transmission of call signals and simulation of a free channel.

10. The improved system of claim 1, comprising:
a branch system at each of said branch points, said branch system operable, in accordance with the association of the channel pairs of adjacent branches on each outgoing channel, to transmit the combination of signals of the associated incoming channels of all other branches to prevent call and free channel simulation, whereas in said combination of signals, the signal of only one incoming channel is also allowed.

11. The improved system of claim 1, comprising:
a branch system in each of said branch points, said branch system including switch-through means connected to said busy signal detecting means and operable to through-connect channels, in accordance with the association of channel pairs of adjacent branches, depending on the occupation status determined by said busy signal detection means, such that no incoming channel is switched through to an outgoing channel when the associated incoming channels are free or that this outgoing channel is marked free and in response to only one associated incoming channel of all other branches being busy that channel is switched through and when more than one of the associated incoming channels are busy a desired one is switched through or the outgoing channel is marked busy.

12. The improved system of claim 10, comprising:
means for coding all signals which are transmitted to prevent signal combinations from being falsely interpreted, and from preventing reading of the respective channel as being free.

13. The improved system of claim 10, wherein:
each of said branching systems comprises a number of inclusive OR gates equal in number to the number of branches of the branch point.

14. The improved system of claim 1, comprising:
a fee computing device connected in said network and responsive to the addresses of the calling and called stations and to the time of information exchange between said stations to calculate the fee for a call.

15. The improved system of claim 3, comprising:
a sync generator in a branch and connected to a special synchronization channel in each one of the two paths.

16. The improved system of claim 15, wherein:
said sync generator is connected at a network end.

17. The improved system of claim 15, wherein:
said branching systems comprise means for switching of the synchronizing channel in the same manner as busy channels.

18. The improved system of claim 15, comprising:
reflex circuits, said reflex circuits connected to the remaining network ends to receive and transfer synchronizing information from an incoming path to an outgoing path.

19. The improved system of claim 18, comprising:
in each path in which synchronizing information from a reflex circuit is transmitted, a delay device for balancing the transit time.

20. The improved system of claim 18, comprising:
each of said reflex circuits which is connected to a network end transmits synchronizing information with an adjustable delay relative to the received synchronizing information, a controllable intermediate memory in each of the incoming paths of said branch points; and
a controllable delay device in each of said branches which has both ends thereof connected to respective branch systems.

21. The improved system of claim 3, wherein each of said stations comprises:
a pair of frame and time slot synchronizing units connected to respective opposite direction paths for obtaining frame and time slot pulses from the bit flow on said paths;
a control unit connected to said synchronizing units;
a pair of receiving memories connected to respective ones of said paths for receiving and storing signals;
a pair of call and signal recognition units connected between said receiving memories, respectively, and said control unit for identifying calls and signals to said control unit;
an analog/digital converter;
a first switch selectively operable to connect said receiving memories to said analog/digital converter; and
a pair of transmitter memories connecting said analog/digital converter to respective ones of said paths for spring message and signal blocks;
said control unit operable during the time slot of a designed connection to control the transfer and transmission of the content of said receiving memories to said transmitter memories via said analog/digital converter.

22. The improved system of claim 21, comprising:
a pair of transmission switches, operated by said control unit, connecting respective transmitter memories and transmission paths.

23. The improved system of claim 21, comprising:
an OR gate for each path and the corresponding opposite path for connecting said transmitter memories to said paths.

24. The improved system of claim 21, wherein:
said paths are optical paths; and comprising
electro-optical converters and opto-electrical converters connecting said stations to said optical paths.

* * * * *